July 24, 1962     S. LEES     3,045,781

VISCOUS DAMPER

Filed May 17, 1957

INVENTOR.
Sidney Lees
BY
George L. Greenfield
his atty

United States Patent Office

3,045,781
Patented July 24, 1962

3,045,781
VISCOUS DAMPER
Sidney Lees, 544 Walnut St., Newton, Mass.
Filed May 17, 1957, Ser. No. 659,962
1 Claim. (Cl. 188—97)

This invention relates to dampers and more particularly comprises a new and improved viscous damper having a wide range of applications.

One important object of my invention is to provide a viscous damper which is extremely compact.

Another important object of my invention is to provide a viscous damper which may be calibrated so that its damping characteristics are known.

Another important object of my invention is to provide a viscous damper which is adjustable so that its damping characteristics can be varied.

Yet another important object of my invention is to provide a viscous damper which has a minimum of moving parts and which can be manufactured inexpensively.

To accomplish these and other objects my damper includes among its important features a chamber through which an axially movable shaft extends. The shaft carries a piston which engages the wall of the chamber and moves along the walls upon movement of the shaft. A passage, separate and distinct from the chamber has its ends connected to the chamber, one on each side of the piston and forms with the chamber a closed and continuous path. The path defined by the passage and the chamber is filled with a liquid.

In one embodiment of my invention a movable plate is disposed in the passage and can be moved to vary the effective cross-sectional area of that passage. In this way, the effective damping coefficient of the instrument is varied. In the other embodiments of my invention means are provided to vary either the viscosity of the liquid or the effective length of the passage.

These and other objects and features of my invention along with its incident advantages will be better understood and appreciated from the following detailed description of a number of embodiments thereof selected for purposes of illustration and shown in the accompanying drawings in which.

Figure 2:
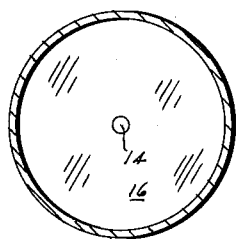
FIGURE 2 is a cross-sectional view taken along the corresponding section line of FIGURE 1.

Before describing in detail the embodiments of my invention shown in the drawings, I will define the functions which determine the magnitude of the viscous damping coefficient in such devices. In particular, for a device having a passage and chamber of circular cross-section, the viscous damping coefficient of the piston is defined as follows:

$$C_d \text{ (effective)} = \frac{R^4_{(c)}}{R^4_{(p)}} 8\pi\mu L \qquad (1)$$

where $C_d$(effective) is the viscous damping coefficient;
$R_{(c)}$ is the radius of the chamber or piston;
$R_{(p)}$ is the radius of the passage;
$\mu$ is the viscosity coefficient of the liquid; and
$L$ is the length of the passage.

This equation may be generalized for devices having passages and chambers of any cross-sectional shape as follows:

$$C_d \text{ effective} = f\frac{A^2_{(c)}}{A^2_{(p)}}\mu L \qquad (2)$$

where $A_{(c)}$ is the cross-sectional area of the chamber;
$A_{(p)}$ is the cross-sectional area of the passage; and
$f$ is dimensional coefficient.

From the foregoing description, those skilled in the art will appreciate that the effective damping of a device of the character which I have invented may be varied by changing either the ratio of the cross-sectional areas of the chamber or piston and the passage, the viscosity of the liquid, or the length of the passage. With this background, the reader will better appreciate the following detailed description of the embodiments of my invention illustrated in the drawings.

Figure 1:
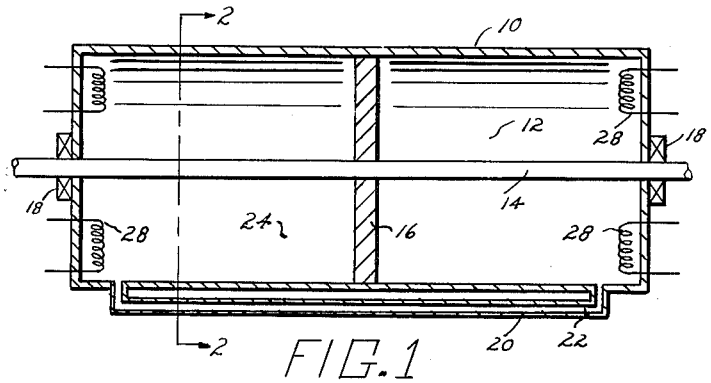
FIGURE 1 is a cross-sectional view of one embodiment of my invention.

The embodiment of my invention shown in FIGURES 1 and 2 includes in its general organization a casing 10 having a chamber 12 formed in its interior and a shaft 14 supporting a piston 16 which moves in the chamber 12. The piston 16 is carried on and moves with the shaft 14 and divides the chamber 12 into two parts. The piston fits snugly in the walls of the chamber and prevents any fluid from passing directly about it from one part of the chamber to the other. The shaft 14 is slideably supported in sealing bearings 18 and in the absence of some restraining member within the casing moves freely in those bearings.

The conduit 20 defines a restrictive passage 22 between the ends of the chamber 12 on each side of the piston 16 and forms a bypass about the piston. Both the chamber 12 and the passage 22 are filled with a viscous fluid 24 which serves to retard movement of the piston 16 in the chamber. The manner in which this is accomplished is quite obvious from the foregoing description for it will be appreciated that in order for the piston 16 to move in the chamber 12, the fluid 24 contained in the chamber and the passage 22 must circulate in the closed continuous liquid path defined by the chamber and the passage. That is, if the piston moves to the right as illustrated in FIGURE 1, the fluid in the part of the chamber 12 to the right of the piston must flow or displace in a clockwise direction about the closed fluid path through the bypass passage 22. Because the radius of the passage 22 is very small compared to the radius of the chamber 12, it follows that the effective viscous damping coefficient on the piston is extremely high as is apparent from Equation 1 above. I have suggested in FIGURE 1 the use of heating coils 28 at the extremities of the chamber 12 to vary the temperature of the fluid 24. Because the viscosity coefficient $\mu$ of the fluid 24 varies with changes in temperature, an operator may regulate the viscous damping coefficient $C_d$ of the device.

Figure 4:
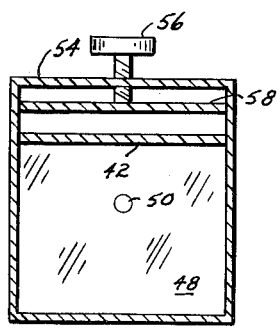
FIGURE 4 is a cross-sectional view taken along the section line 4—4 of FIGURE 3.
Figure 3:
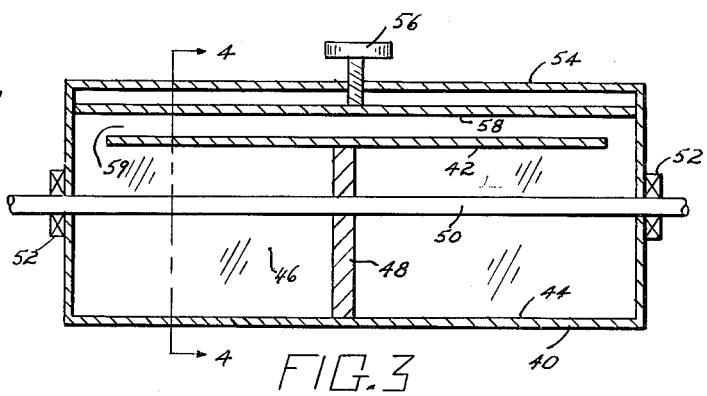
FIGURE 3 is a cross-sectional view of a second embodiment of my invention.

In the embodiment of my invention illustrated in FIGURES 3 and 4, the damping coefficient is varied not by changing the temperature dependent characteristics of the fluid and more particularly the viscosity coefficient $\mu$ but rather by changing the cross-sectional area of the bypass passage about the piston.

Referring particularly to FIGURE 3, the reader will note that the device includes a rectangular case 40 which has a fixed partition 42 extending across its interior. The partition 42 and the bottom wall 44 of the case 40 define a chamber 46 in which a piston 48 moves with its shaft 50. The shaft 50 extends through the end walls of the case 40 and is supported on slide bearings 52 as described in connection with the embodiment of my invention shown in FIGURES 1 and 2.

It will be noted in FIGURE 3 that the ends of the partition 42 terminate short of the end walls of the case 40 and permit fluid within the chamber 46 to flow behind and around the partition. The partition is spaced a short distance from the top wall 54 of the case 40 and a screw 56 extends downwardly through the top wall. The screw 56 carries a plate 58 which may be moved toward and away from the partition 42 to alter the effective cross-sectional area of the passage 59 behind the partition 42. This plate 58 has a rather close fit with the side and end walls of the case but may have adequate clearance to allow fluid to seep up about its sides when the plate is moved toward the partition. Alternatively, a pair of aligned plugs in the upper wall 54 of the case 40 and the plate 58 could be used to permit the flow of liquid to and from the space behind the plate to facilitate movement of the plate.

From the foregoing description it will be appreciated that the spacing of the plate 58, adjustable by means of the screw 56 toward the upper surface of the partition 42, will effect the rate of flow of the liquid through the damping passage 59 defined by the plate and partition when a given pressure is exerted on the shaft 50. That is, when the shaft 50 is actuated by some force causing the piston 48 to move within the chamber 46, the rate of movement of piston 48 will be effected by the cross-sectional area of the passage 59 defined by the plate and partition. This is caused by the change in the viscous damping coefficient due to changes in the ratio of the cross-sectional areas of the chamber and passage.

Figure 5:
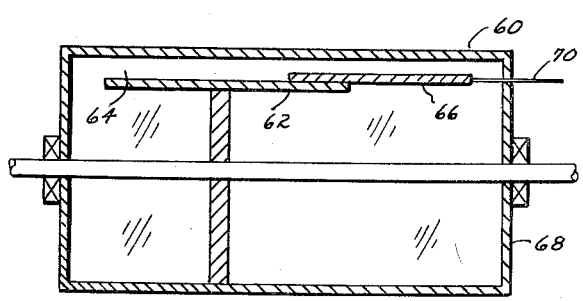
FIGURE 5 is a cross-sectional view of still another embodiment of my invention.

The embodiment of my invention illustrated in FIGURE 5 is similar to the embodiment shown in FIGURE 3. However, the viscous damping coefficient of the device is changed by varying the length of the passage. In detail, the device includes a case 60 similar to the case 40 and which includes a fixed partition 62. The partition 62 defines a passage 64 which serves as a bypass about the piston within the chamber defined by the case and partition. The effective length of the bypass passage 64 may be varied by sliding the plate 66 toward and away from the end wall 68 of the case. It will be appreciated from an inspection of FIGURE 5 that when the plate 66 is moved to the left, as viewed in that figure, the effective length of the bypass passage 64 is shortened while movement of the plate in the opposite direction increases the length of the passage. Because the viscous damping coefficient is a direct function of the length of the passage 64, its magnitude may be varied merely by moving the plate 66. An actuator 70 secured to the end of the plate 66 extends through the end wall 68 of the case and facilitates movements of the plate. Although the plate 66 is illustrated as slideably supported on the partition 62, it should be understood that other arrangements may be used. For example, the plate 66 could telescope on the partition merely by forming the plate with spaced apart and parallel faces. Alternatively, the plate could slide in a slot formed in the partition 62 and accomplish the same function.

Figure 6:
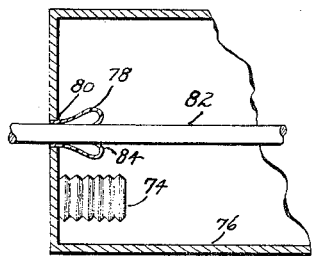
FIGURE 6 is a fragmentary view in section of another modification of my invention.

In FIGURE 6 I have illustrated a portion of a viscous damper which includes an additional feature which may be incorporated into any of the embodiments previously described to allow for expansion and contraction of the liquid under such influences as temperature changes. This is accomplished by a bellows 74 secured to one of the inner surfaces of the case 76. The bellows 74, capable of expanding and contracting, will allow the volume of the liquid within the case of the damper to increase and decrease without exerting excessive pressures upon the case walls or creating an air pocket in the fluid path. The embodiment of FIGURE 6 also includes a flexible sleeve 78 having one end 80 secured to the wall of the case about the opening through which the shaft 82 passes and the other end 84 connected directly to the shaft. This sleeve 78 forms a seal about the opening in the wall of the case and prevents the liquid in the case from seeping out.

From the foregoing description, those skilled in the art will appreciate that numerous modifications may be made of my invention without departing from the spirit thereof. Therefore, I do not intend to limit the breadth of my invention to the specific embodiments illustrated and described. Rather, I intend that the scope of my invention be determined by the appended claims and their equivalents.

Having now described my invention, I claim:

A damper comprising a case, a chamber formed in the case, a piston movable in the chamber, a shaft connected to the piston and extending out of the case, a passage interconnecting the ends of the chamber, said passage open only at the chamber ends and of substantially smaller cross sectional area than the chamber, said passage being defined independently of the piston, means disposed in the passage for simultaneously and uniformly varying its cross sectional area at all points throughout its length, and a liquid filling the chamber and passage.

References Cited in the file of this patent

UNITED STATES PATENTS

| | | |
|---|---|---|
| 1,010,747 | Gray | Dec. 5, 1911 |
| 1,313,763 | Thomas | Aug. 19, 1919 |
| 1,373,315 | Dunn | Mar. 29, 1921 |
| 1,572,484 | Homar | Feb. 9, 1926 |
| 1,736,175 | Rosenthal et al. | Nov. 19, 1929 |
| 1,743,591 | Blanchard | Jan. 14, 1930 |
| 2,180,893 | Best | Nov. 21, 1939 |
| 2,314,404 | Katcher | Mar. 23, 1943 |

FOREIGN PATENTS

| | | |
|---|---|---|
| 536,315 | Great Britain | May 9, 1941 |